Figure 1:
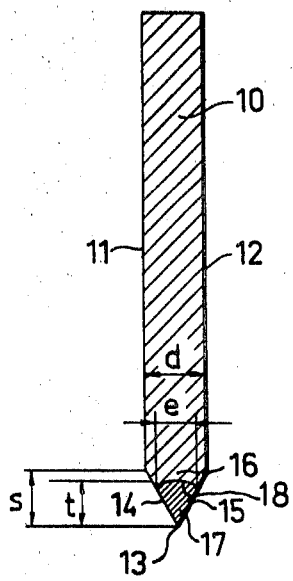

United States Patent

[11] 3,581,604

| [72] | Inventor | Eugene Olof Malm<br>Snadviken, Sweden |
|---|---|---|
| [21] | Appl. No. | 798,524 |
| [22] | Filed | Nov. 18, 1968<br>Division of Ser. No. 557,428, June 14, 1966,<br>Pat. No. 3,411,208 |
| [45] | Patented | June 1, 1971 |
| [73] | Assignee | Sandvik Steel of Colorado, Inc.<br>Denver, Colo. |
| [32] | Priority | June 14, 1965 |
| [33] | | Sweden |
| [31] | | 7,776/65 |

[54] CUTTING STRIPS, CUTTING DIE KNIVES, CUTTING RULES AND THE LIKE
4 Claims, 4 Drawing Figs.

[52] U.S. Cl. .......................................... 76/101
[51] Int. Cl. .......................................... B21k 21/00

[50] Field of Search ............................... 76/101, 107 C, 104; 30/346.54, 350

[56] References Cited
FOREIGN PATENTS

| 151,745 | 10/1955 | Sweden .................. | 76/101 |
| 152,626 | 12/1955 | Sweden .................. | 76/101 |

*Primary Examiner*—Bernard Stickney
*Attorney*—Curtis, Morris & Safford

ABSTRACT: A method for producing a steel cutting strip with a main strip portion of substantially uniform hardness throughout, and a cutting edge portion integral therewith which is of much greater hardness throughout. The cutting edge portion is connected to the main strip portion by a thin layer integral with both of said portions. With this arrangement the cutting edge is sufficiently small to permit it to be bent without damage, even though it is extremely hard, and the bond to the main strip portion remains intact.

CUTTING STRIPS, CUTTING DIE KNIVES, CUTTING RULES AND THE LIKE

This application is a division of application Ser. No. 557,428, filed June 14, 1966, now U.S. Pat. 3,411,208.

This invention relates to cutting strips which are provided with presharpened and prehardened cutting edges, the term cutting strip generally being used herein to include cutting die knives, cutting rules and die steel strips of the types which are used to cut various materials, such as, textiles, leather, plastic sheets, paper, etc. Such cutting strips may be used without further sharpening or heat treating and may be bent to desired shapes to form finished cutting dies.

It is an object of the present invention to provide improved cutting strips of the above character. It is a further object to provide improved cutting knife and cutting die structures of a wide range of characteristics and configurations. It is a further object to provide for the above with cutter strips and cutter knives which are superior to those available in the past and which may be used without the difficulties which have been encountered with prior structures. These and other objects will be in part obvious and in part pointed out below.

With cutting strips, it is desirable to provide a sharp cutting edge of precise dimensions and characteristics, and to support the edge during use. For example, a clicker die is produced by bending the cutting knife strip to form a closed configuration and then interconnecting the ends. The die is then placed with its cutting edge upon the sheet material being cut and is pressed against the material to perform the cutting operation. In the past it has been recognized that there are definite limitations upon the angle or arc through which prehardened strips could be bent, i.e., the hardened cutting edge imposed limitations upon the bending. It is an object of the present invention to provide great freedom with respect to the acceptable bending characteristics of cutting strips. In accordance with the present invention, a strip of steel which has been presharpened along one edge, which has been given substantially uniform hardness throughout, is subjected to an edge-hardening operation producing a hardened cutting edge strip which is of much greater hardness than the remainder of the knife. Furthermore, the hardened cutting edge strip is quite narrow, so that it extends only a short distance from the cutting, and it is of substantially uniform hardness throughout. Hence, the resulting cutting strip has two portions, each of which is of substantially uniform hardness throughout, and which are interconnected or "bonded" together at a relatively thin layer or zone. The main strip portion or body has the hardness of the original strip, and it may be bent or otherwise worked. The cutting edge strip is of the hardness desired for the cutting edge, and it is supported throughout by its interconnection with the main strip portion. The cutting edge strip is relatively small in cross section, so that it may be bent easily and without causing undue stress or cracking. The main strip portion is sufficiently resilient to cause the structure to withstand relatively severe abuse without damage. That is, the main strip provides the desired support and rigidity, and yet it will absorb impact forces which might damage similar structures of the prior art.

Referring to the drawings, FIGS. 1 to 4 are enlarged cross-sectional views of four cutting strips constituting embodiments of the invention.

Referring to FIG. 1 of the drawings, a cutting strip 10 has two plane side faces 11 and 12 and a cutting edge 13 positioned centrally between the planes of the side faces. The cutting edge is formed by the intersection of two plane cutting edge surfaces 14 and 15 which define the converging cutting edge portion 16 of the strip. The forepart of the converging cutting edge portion 16 is the cutting edge strip 17 which is of greater hardness than the main strip portion. The cutting edge portion 17 is connected to the main strip portion along the relatively thin zone represented in the drawing by a line and constituting a thin layer portion 18. This thin layer portion is generally a segment of a cylinder, the axis of the cylinder being substantially along the cutting edge 13, or along a line parallel thereto.

Figure 2:
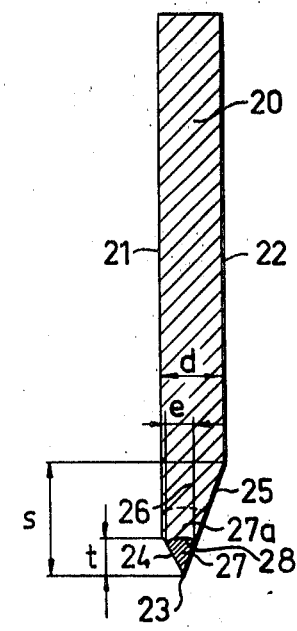

In the embodiment of FIG. 2, the cutting strip 20 has side faces 21 and 22, and has its cutting edge 23 eccentric, i.e., offset from the center plane of the strip toward the side face 21. The cutting edge is formed by the converging plane cutting edge surfaces 24 and 25 which are inclined approximately at the same angle with respect to their side faces, so that surface 25 is of greater width than surface 24. A layer portion 28 connects the cutting edge strip to the main strip portion.

Figure 3:
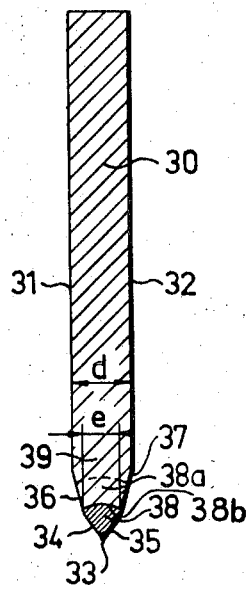
Figure 4:
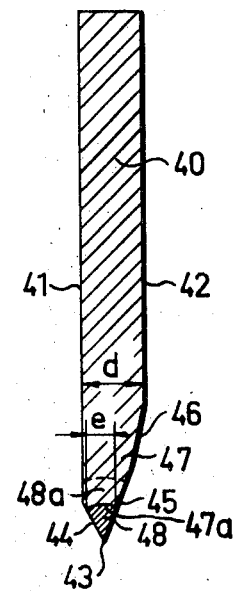

In the embodiment of FIG. 3, the cutting strip 30 has side faces 31 and 32 and a cutting edge 33 formed by surfaces 34 and 35 upon the cutting edge strip 38. A pair of upper converging surfaces 36 and 37 define the tapered edge portion 39 of the main strip portion to which cutting edge strip 38 is connected by the layer 38b. In the embodiment of FIG. 4, the cutting strip 40 has side faces 41 and 42 and an eccentric cutting edge 43 upon a cutting edge strip 48 and formed by converging surfaces 44 and 45. An additional surface 46 provides an additional taper above surface 45 and defines the top of the tapered edge of the main strip portion. A thin layer 47a interconnects the harder portion 48 to the portion 47.

The intermediate or interconnecting layer (18 in FIG. 1) forms a transition layer between the harder cutting edge portion and the main part of the knife. This transition layer often is at least partly softer than the main part of the knife. The depth of the transition layer measured in the same direction as "$t$" may be for instance ½$t$—⅓$t$ and is often of the size order 0.1 mm.

The cutting strips may be of either alloyed or carbon steels, but illustratively are of carbon steels which contain: or 0.5 percent to 0.8 percent of carbon, 0.15 percent to 75 percent of silicone, and 0.15 percent to 0.75 percent of manganese, the content of silicone and manganese being usually less than 0.35 percent and 0.60 percent respectively. One such steel contains: 0.15 percent to 0.6 percent carbon, 0.15 percent to 0.35 percent silicone and 0.4 percent to 0.6 percent manganese.

In producing the cutting strips, the strip is first hardened preferably by a complete bainite hardening process. When there is partial bainite hardening, the structure contains both bainite and tempered martensite, usually up to 50 percent martensite. After the above hardening, one or each edge of the strip is ground to form a cutting edge of the shape desired in the finished cutting strip. The cutting edge is then subjected to the edge-hardening process, suitably using high frequency induction heating. The side faces of the strip may then be decarburized so as to increase the ductility for bending. The hardened cutting edge strip is spaced from the side faces and is not decarburized.

The cutting edge hardening is carried on in such a way as to produce the physical structure shown in the drawings and described above, with each of the cutting strips including a hardened cutting edge strip. The transverse dimension or maximum thickness of the cutting edge strip has the dimension $e$, and the main strip portion has the thickness of $d$. Measured from the cutting edge along the center plane of the strip, the depth or width of the cutting edge strip is indicated at $t$, and the depth or width of the tapered portion is indicated at $s$, and $t$ is less than $s$. Hence, the cutting edge strip comprises only a portion of the tapered edge of the cutting strip and $e$ is substantially less than $d$. In practice, $e$ is not greater than 0.85 of $d$, usually less than 0.6 of $d$, and often not greater than .4 of $d$. The dimension $t$ is of the order of 0.2 mm. to 0.5 mm. usually between 0.3 mm. and 0.5 mm.

The main strip portion is of substantially uniform hardness, which is the hardness of the entire strip prior to the cutting edge hardening. That hardness and the other particular characteristics of the steel are determined by the desired characteristics and the proposed use of the cutting strip. However, in general, the hardness of the main strip portion is of the order of 285 to 450 Vickers, preferably within the range of 300 to 420 Vickers. The hardness of the cutting edge strips is within the range of 480 to 720 Vickers, the hardness being determined by the use for which the cutting strip is intended.

Such cutting strips for use in cutting paper having a hardness of the order of 540 to 660 Vickers, and of the order of 480 to 600 Vickers for use with textiles, leather, plastics and the like.

While it has been explained above that the hardness of the main strip portion is substantially uniform up to the interconnecting layer (18 in FiG. 1), the heat treatment may produce some change in the hardness of the main strip portion adjacent the interconnecting layer. However, any such change in hardness is not significant, and in no case is it sufficient to interfere with the proper use and operation of the cutting strip. The interconnecting layer 18 and the interconnecting layers in the other embodiments have a thickness of the order of 0.1 mm., although that thickness may vary, depending upon the particular steel, the size and shape of the strip and the cutting edge and the other characteristics which are determined for each particular cutting strip.

In general, the cutting edge angle (e.g., between surfaces 14 and 15 in FIG. 1) is of the order of 40° to 60°, suitably 52° and 55° for other of the above uses.

This invention provides the advantage that the zone which is of greater hardness has a smaller thickness than the main strip portion, Hence, the cutting strip may be bent and otherwise worked without undue strain upon the hardened cutting edge strip. In effect, the cutting edge strip is of such small width and cross section that the cutting strip may be bent around much smaller radii than has been possible with prior cutting strips and knives. For example, a cutting strip of 0.7 mm. thickness can be bent around a minimum radius of 0.75 mm. Under normal circumstances the bending is cold. However, on exceptional occasions, the cutting strip may be heated, but not to a temperature to destroy the hardness of the cutting edge strip. It has been found that cutting die knives produced in accordance with the present invention may have their cutting edges creased laterally to produce code markings, without ruptures in the cutting edges. The above is possible because the hardened cutting edge strip is of such small cross section that it is not damaged by sharp bends, and the relatively soft metal adjacent and in the interconnecting layer is sufficiently ductile to permit it to be deformed.

In practice the present invention can be applied to cutting die knives for paper, for example, with a cutting knife thickness of 0.7 mm. to 1.4 mm. and a height of 12.5 mm. to 50 mm. For leather, the thickness may be 1.4 mm. to 5 mm., with a height of 12½ mm. to 50 mm. Dies produced from cutting strips of smaller thickness require frame supports, whereas dies produced from thick cutting strips may be stabilized by ties.

What I claim is:

1. The method of making a cutting strip which comprises the steps of, producing a steel cutting strip of controlled initial hardness and having substantially the cross-sectional configuration desired in the cutting strip and having a main body portion with longitudinal side faces and a cutting edge portion with converging longitudinal surfaces which intersect to form a sharp cutting edge, said hardness being such that the strip maybe deformed by bending or the like, and hardening the longitudinal portion of said cutting strip which is immediately adjacent said sharp cutting edge to increase substantially the hardness of said longitudinal portion with substantially no variation in hardness throughout said longitudinal portion, said hardening also providing a transition layer between said longitudinal portion and the main body of portion of the strip, said longitudinal portion having a maximum dimension from said cutting edge such that its dimension between said converging longitudinal surfaces is less than the maximum thickness of said cutting strip, whereby said strip comprises the main body portion having said initial hardness throughout and said longitudinal portion of substantially greater hardness and uniformity throughout and said transition layer having the characteristics that it bonds said longitudinal portion to said body portion and having a hardness which is less than said greater hardness and having a thickness which is not substantially greater than in the order of 0.1 mm.

2. The method of claim 1 wherein said producing step includes hardening the steel cutting strip by a complete bainite hardening process, and wherein said hardening of said longitudinal portion is produced by utilization of high frequency induction heating.

3. The method of claim 2 which includes the additional step of decarburizing the said faces of said strip to increase the ductility for bending.

4. The method of claim 3 wherein said initial hardness of said cutting strip is of the order of 300 to 420 Vickers, and wherein the greater hardness of said longitudinal portion is of the order of 480 to 720 Vickers.